(12) United States Patent
Kawai

(10) Patent No.: US 8,876,161 B2
(45) Date of Patent: Nov. 4, 2014

(54) BUCKLE, AND SEAT BELT APPARATUS INCLUDING THIS

(75) Inventor: Yoshihiko Kawai, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 13/992,017

(22) PCT Filed: Dec. 5, 2011

(86) PCT No.: PCT/JP2011/006788
§ 371 (c)(1),
(2), (4) Date: Jun. 6, 2013

(87) PCT Pub. No.: WO2012/081189
PCT Pub. Date: Jun. 21, 2012

(65) Prior Publication Data
US 2013/0249270 A1 Sep. 26, 2013

(30) Foreign Application Priority Data

Dec. 15, 2010 (JP) ................................ 2010-279240

(51) Int. Cl.
*A44B 11/25* (2006.01)
*B60R 22/02* (2006.01)
*B60R 22/00* (2006.01)

(52) U.S. Cl.
CPC ......... *A44B 11/2561* (2013.01); *A44B 11/2515* (2013.01); *B60R 22/023* (2013.01); *B60R 22/00* (2013.01); *A44B 11/2507* (2013.01)
USPC .......... 280/801.1; 180/268; 297/468; 24/636; 24/640

(58) Field of Classification Search
CPC ............... A44B 11/00; A44B 11/2503; A44B 11/2507; A44B 11/2515; A44B 11/2523; A44B 11/2534; A44B 11/2584; A44B 11/2588; A44B 11/2596; B60R 22/02; B60R 22/48

USPC .......... 280/801.1; 180/268; 24/627–632, 636, 24/637, 593.1, 641, 639, 647; 297/468
See application file for complete search history.

(56) References Cited

U.S. PATENT DOCUMENTS

| | | | | |
|---|---|---|---|---|
| 4,670,952 A | * | 6/1987 | Ishiguro | 24/641 |
| 5,159,732 A | * | 11/1992 | Burke | 24/641 |
| 5,584,107 A | | 12/1996 | Koyanagi et al. | |
| 6,370,742 B1 | * | 4/2002 | Yamaguchi et al. | 24/641 |
| 7,124,481 B2 | * | 10/2006 | Sato et al. | 24/641 |
| 2005/0257354 A1 | * | 11/2005 | Kawai et al. | 24/641 |

(Continued)

FOREIGN PATENT DOCUMENTS

| | | |
|---|---|---|
| CN | 1374212 A | 10/2002 |
| JP | 56-158807 | 11/1981 |

(Continued)

OTHER PUBLICATIONS

International Search Report PCT/JP2011/006788 dated Jan. 17, 2012.

*Primary Examiner* — Faye M Fleming
*Assistant Examiner* — Darlene P Condra
(74) *Attorney, Agent, or Firm* — Foley & Lardner LLP

(57) ABSTRACT

A seat belt buckle for receiving a tongue connected to a seat belt webbing. The buckle includes a first ejector spring in a position out of an area α of the path of movement of an engagement portion of the tongue and an imaginary extended area β extended from the area α in the direction of movement of the engagement portion, and on the outer side of a base. A second ejector spring is provided in a position out of at least one of the area α and the imaginary extended area β, and on the outer side of the base 8. A bracket for fixing the buckle to the vehicle body can be provided closer to a tongue insertion hole, thereby reducing the length of the buckle in the tongue insertion direction.

4 Claims, 5 Drawing Sheets

(56) References Cited

U.S. PATENT DOCUMENTS

| | | | |
|---|---|---|---|
| 2006/0290130 A1* | 12/2006 | Hall | 280/801.1 |
| 2007/0084026 A1* | 4/2007 | Muromachi | 24/636 |
| 2009/0038126 A1* | 2/2009 | Krauss et al. | 24/633 |
| 2010/0263176 A1* | 10/2010 | Lee et al. | 24/593.1 |

FOREIGN PATENT DOCUMENTS

| | | |
|---|---|---|
| JP | 06-283914 | 10/1994 |
| JP | 08-070912 | 3/1996 |
| JP | 2000-043681 | 2/2000 |
| JP | 2000-108843 | 4/2000 |
| JP | 2001-046117 | 2/2001 |
| JP | 2001-080462 | 3/2001 |
| JP | 2002-238619 | 8/2002 |
| JP | 2007-015539 | 1/2007 |
| JP | 4411281 | 2/2010 |
| KR | 2002-0067630 A | 8/2002 |
| WO | WO-2005/039943 | 5/2005 |

* cited by examiner

BUCKLE, AND SEAT BELT APPARATUS INCLUDING THIS

TECHNICAL FIELD

The present invention relates to a technical field of a buckle used in a seat belt apparatus installed in a seat of a vehicle such as an automobile, and a technical field of a seat belt apparatus including this buckle.

BACKGROUND ART

Seats of various vehicles such as automobiles are provided with a seat belt apparatus in order to restrain an occupant with a seat belt and to inhibit inertial movement in the event of emergency such as a collision when a deceleration larger than during normal driving is exerted on the vehicle. Such a seat belt apparatus includes, in order to simplify the operation to put on the seat belt performed by the occupant, generally, a tongue supported by the seat belt, and a buckle that is fixed to the vehicle body and into which this tongue is inserted and latched.

A buckle including a latch member that, when a tongue is inserted, enters an engagement hole of the tongue and is engaged with the tongue, a release operation member that causes the latch member to exit from the engagement hole of the tongue and releases the latch member from engagement with the tongue, an ejector that, when the release operation member releases the latch member from engagement with the tongue, presses the tongue in a direction in which the tongue separates from the buckle, and an ejector spring that always urges the ejector in a direction in which the tongue separates from the buckle, is known as a buckle used in conventional seat belt apparatuses (see, for example, PTLs 1 and 2).

In a seat belt apparatus including this type of buckle, when an occupant puts on a seat belt, the tongue is inserted into the buckle, the latch member is engaged with the tongue, and the tongue is thereby engaged with the buckle. Thus, the seat belt is put on by the occupant. In the event of emergency described above, the occupant is restrained by the seat belt, and therefore their inertial movement is inhibited. When the seat belt is taken off by the occupant, the release operation member is pressed by the occupant, and the engagement of the latch member with the tongue is thereby released. The ejector pushes the tongue out of the buckle owing to the urging force of the ejector spring. Thus, the seat belt is taken off of the occupant.

CITATION LIST

Patent Literature

PTL 1: Japanese Unexamined Patent Application Publication No. 2001-080462
PTL 2: Japanese Unexamined Patent Application Publication No. 2001-046117

SUMMARY OF INVENTION

Technical Problem

In the conventional buckles described in PTLs 1 and 2, a tongue insertion hole, an ejector, an ejector spring, and a bracket that is fixed to the vehicle body and that supports the base of the buckle are arranged in a straight line in the area of movement of the engagement portion of the tongue inserted through the tongue insertion hole or an imaginary extended area extended in the direction of movement of the engagement portion. Therefore, the conventional buckles are relatively long in the longitudinal direction thereof (the tongue insertion direction).

However, the longer a buckle is in the longitudinal direction (the tongue insertion direction) as described above, the more significantly the buckle protrudes from the vehicle seat. Therefore, the buckle may make an occupant sitting in the vehicle seat uncomfortable. In particular, in a seat belt apparatus provided in a rear seat, the buckle is placed in the middle of a rear seat extending in the left-right direction of the vehicle, and therefore it is highly likely that the buckle makes the occupant uncomfortable.

The present invention is made in view of such circumstances, and it is an object of the present invention to provide a buckle whose length in the tongue insertion direction can be further reduced, and a seat belt apparatus including this.

Solution to Problem

To solve the above problem, a buckle of the present invention includes a base, a tongue insertion hole into which an engagement portion of a tongue is inserted, a latch member supported by the base movably between a non-engaged position where the latch member cannot be engaged with the engagement portion of the tongue inserted through the tongue insertion hole and an engaged position where the latch member can be engaged with the engagement portion of the tongue inserted through the tongue insertion hole, a release operation member that moves the latch member in the engaged position toward the non-engaged position, an ejector that is movably provided in the base and that presses the engagement portion of the tongue inserted through the tongue insertion hole in a direction in which the engagement portion separates from the tongue insertion hole, and an ejector spring that urges the ejector toward the tongue insertion hole. The whole of the ejector spring is provided in a position out of an area of the path of movement of the engagement portion of the tongue inserted through the tongue insertion hole and an imaginary extended area extended from the area of the path of movement of the engagement portion of the tongue in the direction of movement of the engagement portion.

In the buckle of the present invention, the base has first and second side walls arranged at a predetermined interval and extended in the same or substantially the same direction as the direction of movement of the engagement portion of the tongue inserted through the tongue insertion hole, the first and second side walls respectively have first and second through-holes through which the ejector is movably passed, the ejector spring includes first and second ejector springs, the ejector presses the engagement portion of the tongue inserted through the tongue insertion hole between the first and second side walls of the base, and the first ejector spring presses a part of the ejector passed through the first through-hole of the first side wall of the base, and the second ejector spring presses another part of the ejector passed through the second through-hole of the second side wall of the base.

A seat belt apparatus of the present invention includes a seat belt capable of restraining an occupant, a seat belt retractor that is provided in a vehicle body and that retracts the seat belt, a tongue slidably supported by the seat belt, and a buckle that is provided in the vehicle body and with which the tongue is disengageably engaged. The buckle is the above-described buckle of the present invention.

Advantageous Effects of Invention

In the buckle of the present invention having the above configuration, the whole of the ejector spring that always urges the ejector toward the tongue insertion hole is provided in a position out of an area of the path of movement of the engagement portion of the tongue or an imaginary extended area extended from the area of the path of movement of the engagement portion of the tongue in the direction of movement of the engagement portion. Therefore, the bracket for fixing the buckle to the vehicle body can be provided much closer to the tongue insertion hole compared to the above-described conventional buckle. Consequently, the length of the buckle in the direction of movement of the tongue can be significantly reduced.

In particular, since the ejector spring is divided into the first ejector spring and the second ejector spring, the first ejector spring can be provided on the outer side (on the side opposite to the second side wall) of the first side wall of the base having both side walls, and the second ejector spring can be provided on the outer side (on the side opposite to the first side wall) of the second side wall of the base without exerting a moment (offset load) on the ejector. In that case, because the release operation member needs to have a certain size, there is a dead space on the outer side of each of the side walls. The dead spaces can be effectively utilized by providing the first and second ejector springs in these spaces. When the first and second ejector springs are provided in these spaces, the size of the buckle in the direction of insertion of the tongue can be reduced almost without increasing the size of the buckle in a direction perpendicular to the direction of insertion of the tongue in a plane parallel to the plane of the engagement portion of the tongue.

In the seat belt apparatus of the present invention, since the length of the buckle in the direction of insertion of the tongue can be reduced, the buckle does not protrude from the vehicle seat. Consequently, the possibility that the buckle makes the occupant sitting in the vehicle seat uncomfortable can be inhibited. In particular, in a seat belt apparatus provided in the rear seat, the possibility that the buckle makes the occupant uncomfortable can be inhibited more effectively. Consequently, when the buckle is installed in the vehicle compartment, the buckle hardly makes the occupant uncomfortable, and at normal time, the occupant can feel comfortable in the vehicle compartment.

DESCRIPTION OF EMBODIMENTS

The embodiment of the present invention will be described with reference to the drawings.

Figure 1:
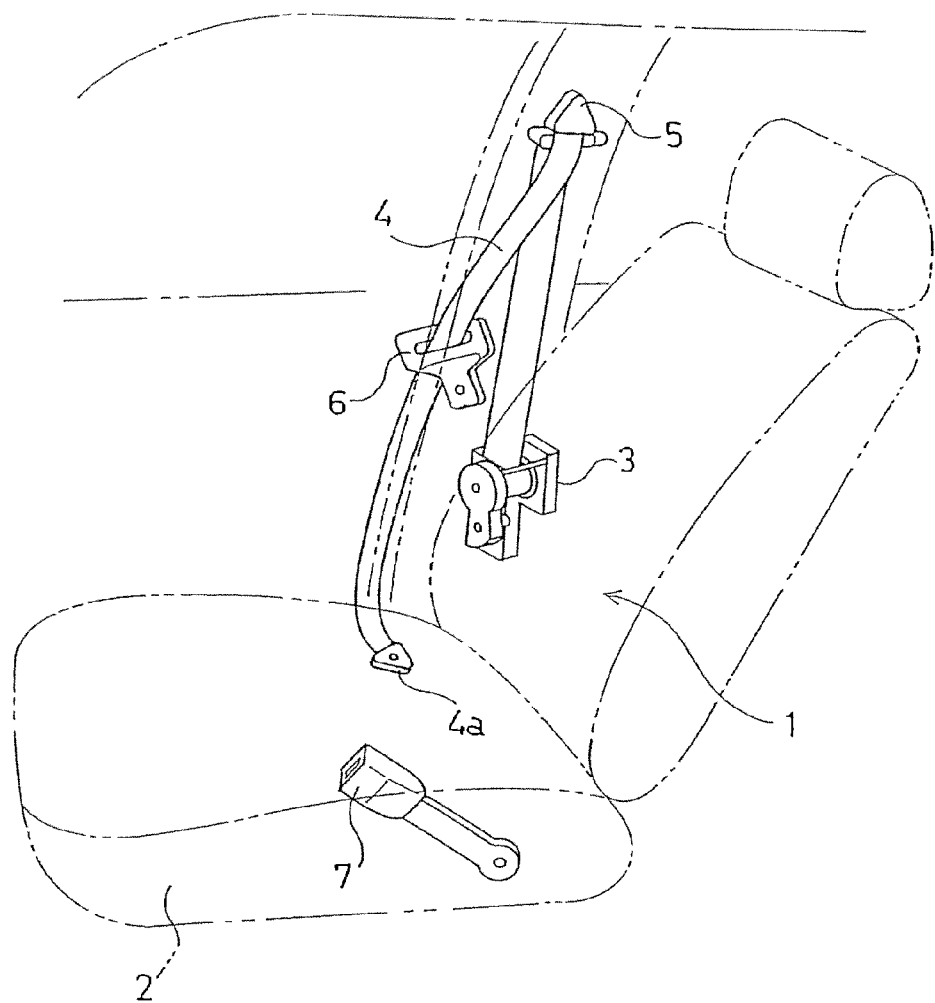
FIG. 1 schematically shows a seat belt apparatus including an example of an embodiment of a buckle according to the present invention.

FIG. 1 schematically shows a seat belt apparatus including an example of an embodiment of a buckle according to the present invention.

As shown in FIG. 1, the seat belt apparatus 1 of this example is basically the same as a known three-point seat belt apparatus. In the figure, reference numeral 1 denotes a seat belt apparatus, reference numeral 2 denotes a vehicle seat, reference numeral 3 denotes a seat belt retractor provided in the vicinity of the vehicle seat, reference numeral 4 denotes a seat belt withdrawably retracted by the seat belt retractor 3 and having at the distal end thereof a belt anchor 4a fixed to the floor of the vehicle body or the vehicle seat 2, reference numeral 5 denotes a guide anchor that guides the seat belt 4 withdrawn from the seat belt retractor 3 toward the shoulder of an occupant, reference numeral 6 denotes a tongue slidably supported by the seat belt 4 guided from the guide anchor 5, and reference numeral 7 is a buckle that is fixed to the floor of the vehicle body or the vehicle seat and into which the tongue 6 is disengageably inserted and latched.

Figure 2A:
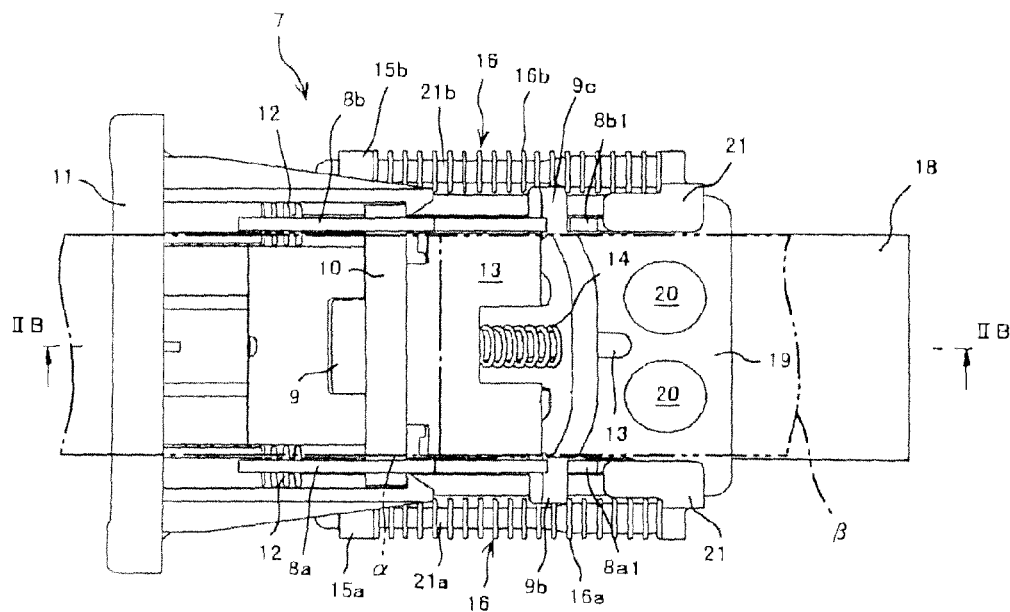
FIG. 2 (A) is a top view (plan view) partly showing the buckle used in the seat belt apparatus of this example with the tongue not inserted therein, and FIG. 2 (B) is a sectional view taken along line IIB-IIB of FIG. 2 (A).
Figure 2B:
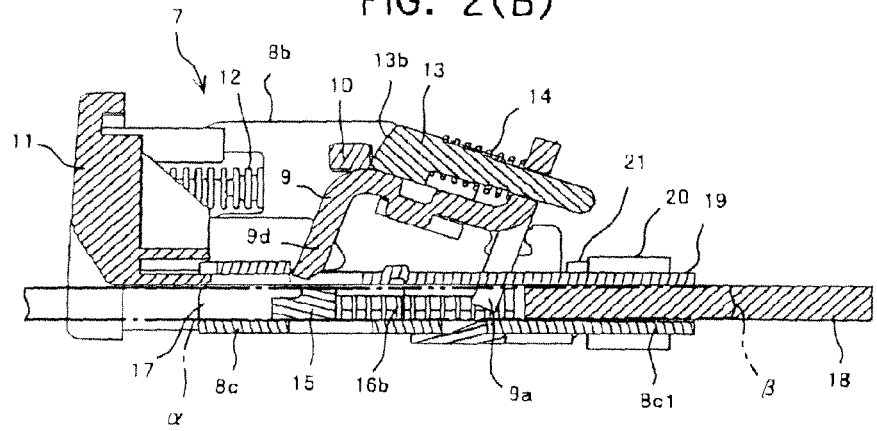
Figure 3A:
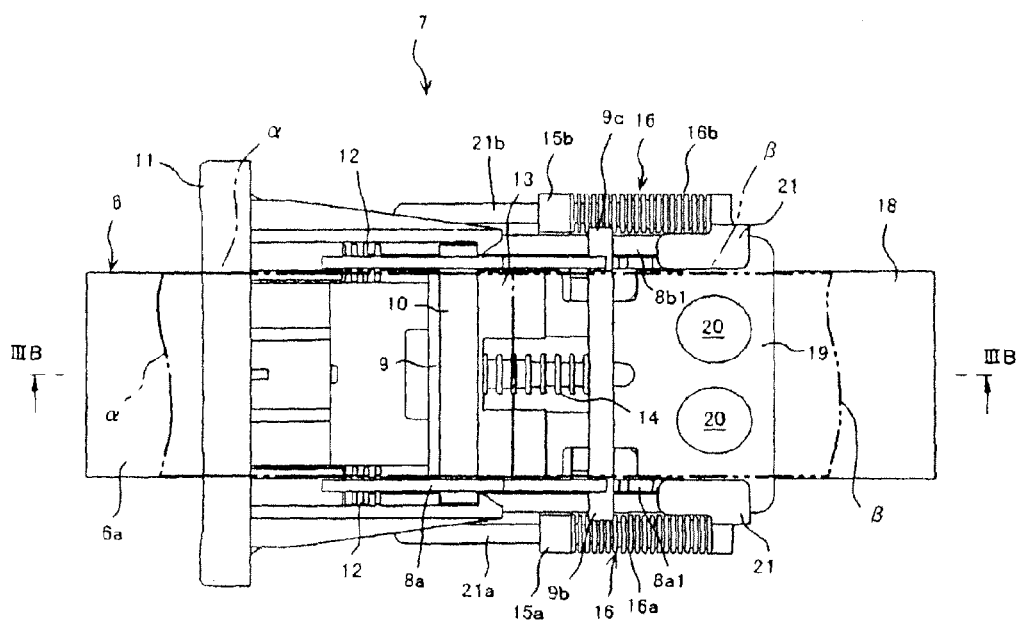
FIG. 3 (A) is a top view (plan view) partly showing the buckle of this example with the tongue inserted therein, and FIG. 3 (B) is a sectional view taken along line IIIB-IIIB of FIG. 3 (A).
Figure 3B:
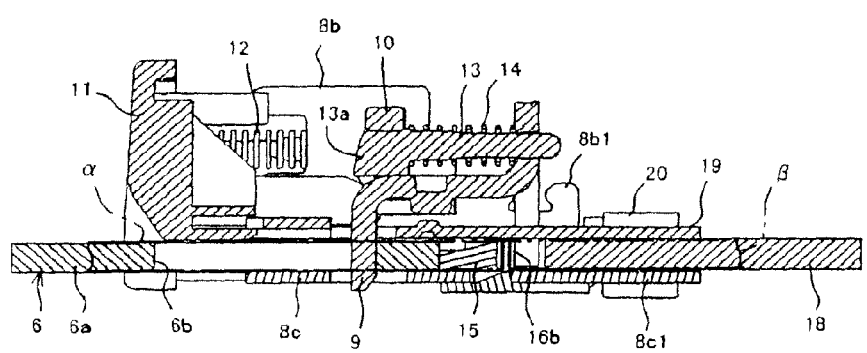

FIG. 2 (A) is a top view (plan view) partly showing the buckle used in the seat belt apparatus of this example with the tongue not inserted therein. FIG. 2 (B) is a sectional view taken along line IIB-IIB of FIG. 2 (A). FIG. 3 (A) is a top view (plan view) partly showing the buckle used in the seat belt apparatus of this example with the tongue inserted therein and engaged therewith. FIG. 3 (B) is a sectional view taken along line IIIB-IIIB of FIG. 3 (A).

The configuration and operation of the buckle 7 of this example is basically substantially the same as the configuration and operation of the buckle described in PTL 1.

So, first, the differences between the configuration of the buckle 7 of this example and the configuration of the buckle described in PTL 1 will be described.

As shown in FIGS. 2 (A), 2 (B), 3 (A), and 3 (B), the buckle 7 of this example includes a base 8 that is a U-shaped frame having first and second side walls 8a and 8b and a bottom portion 8c, a latch member 9 that is rotatably supported by the first and second side walls 2a and 8b of the base 8 and that is movable between a non-latched position where the latch member 9 cannot be latched (engaged) with a planar engagement portion 6a of the tongue 6 and a latched (engaged) position where the latch member 9 can be latched (engaged) with the tongue 6, a lock pin 10 that is movably provided in the first and second side walls 8a and 8b of the base 8 and that blocks the movement of the latch member 9 in the latch releasing direction, an operation button 11 that is a release operation member provided on the first and second side walls 8a and 8b of the base 8 movably in the longitudinal direction, button springs 12 that always urge the operation button 11, a slider 13 that is slidably supported by the latch member 9 and that is interposed between the latch member 9 and the lock pin 10 when the tongue 6 and the latch member 9 are latched with each other, a slider spring 14 that is provided in a compressed state between the slider 13 and the latch member 9 and that always urges the slider 13 toward the lock pin 10, an ejector 15 that is provided on the bottom portion 8c of the base 8 slidably in the longitudinal direction of the base 8 and that can urge (press) the tongue 6 in a direction in which the tongue 6 separates from the buckle 7, and an ejector spring 16 that always urges the ejector 15 in a direction in which the tongue 6 separates from the buckle 7 (that is, a direction toward a tongue insertion hole 17 to be described later).

In that case, the buckle 7 of this example has an tongue insertion hole 17 provided between one end of the bottom portion 8c of the base 8 and the operation button 11. The above-described components (members denoted by reference numerals 9 to 16) are mounted in the base 8. The bottom portion Sc of the base 8 is fixed to a bracket 18 fixed to the vehicle body, and the buckle 7 is thereby fixed to the vehicle body with the bracket 18 therebetween. In that case, by interposing the bracket 18 between an end $8c_1$ of the bottom portion 8c of the base 8 opposite to the tongue insertion hole 17 and a plate 19 and fastening with a pair of rivets 20, the buckle 7 is attached to the bracket 18. Although not shown, as with the buckle described in PTL 1, the base 8 in which the above-described components (9 to 16) of the buckle 7 are mounted is covered by an upper cover and a lower cover from above and below.

In the buckle 7 of this example, the ejector spring 16 includes a pair of a first ejector spring 16a and a second ejector spring 16b. The first and second ejector springs 16a and 16b both have an elastic constant, a coil diameter, and a spring wire diameter less than those of a conventional ejector spring, and have the same elastic constant and size (coil diameter, spring wire diameter, and length in the longitudinal direction).

The whole of the first ejector spring 16a is provided in a position in the buckle 7 out of an area $\alpha$ of the path of movement of the engagement portion 6a of the tongue 6 and an imaginary extended area $\beta$ extending from the area $\alpha$ in the direction of movement of the engagement portion 6a, and on the outer side (on the side opposite to the second side wall 8b) of the first side wall 8a of the base 8. The whole of the second ejector spring 16b is provided in a position out of the area $\alpha$ and the imaginary extended area $\beta$, and on the outer side (on the side opposite to the first side wall 8a) of the second side wall 8b of the base 8.

As shown in FIGS. 2 (A), 4 (A), 4 (B), and 5 (A), the first and second ejector springs 16a and 16b are respectively supported by ejector spring guide supporting members 21 fixed to ends $8a_1$ and $8b_1$ of the first and second side walls 8a and 8b to which the bracket 18 is fixed. In that case, the ejector spring guide supporting members 21 include a first ejector spring guide 21a extended parallel or substantially parallel to the first side wall 8a toward the tongue insertion hole 17, and a second ejector spring guide 21b extended parallel or substantially parallel to the second side wall 8b toward the tongue insertion hole 17. The first ejector spring 16a is fitted on the first ejector spring guide 21a and guide-supported thereby. The second ejector spring 16b is fitted on the second ejector spring guide 21b and guide-supported thereby.

Figure 4A:
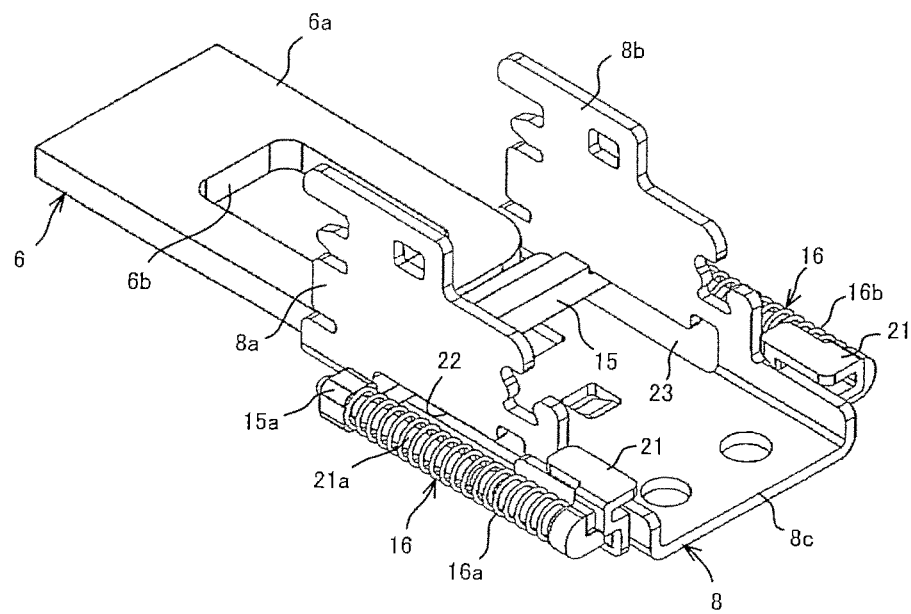
FIG. 4 (A) is a perspective view of the relationship between the tongue inserted in the buckle, the ejector, the ejector springs, and the base seen obliquely from above, and FIG. 4 (B) is a perspective view of the relationship seen obliquely from below.
Figure 4B:
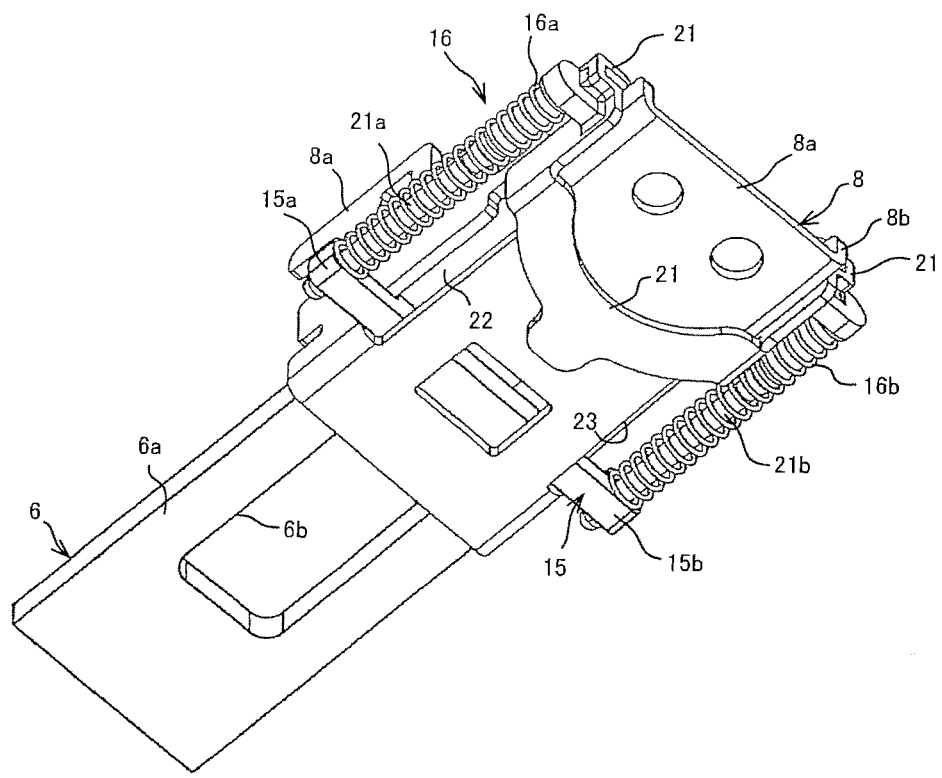

As shown in FIGS. 4 (A) and 4 (B), the first and second side walls 8a and 8b respectively have first and second through-holes 22 and 23 formed therein so as to extend in the direction of movement of the ejector 15. A first end 15a of the ejector 15 in a direction perpendicular or substantially perpendicular to the direction of movement of the ejector 15 is slidably passed through the first through-hole 22, and a second end 15b of the ejector 15 in the direction is slidably passed through the second through-hole 23.

Figure 5A:
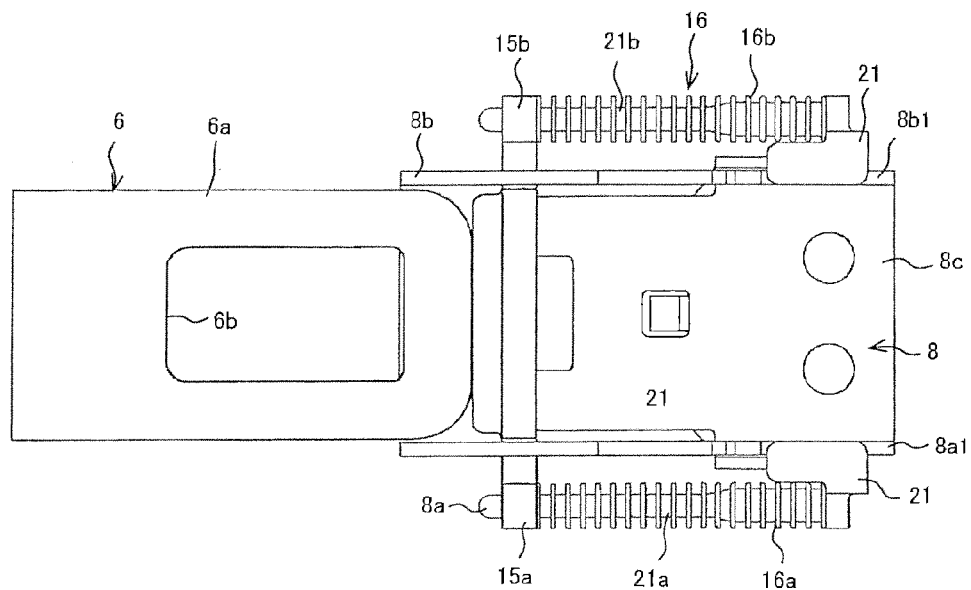
FIG. 5 (A) is a top view (plan view) of FIG. 4 (A), and FIG. 5 (B) is a front view of FIG. 4 (A).
Figure 5B:
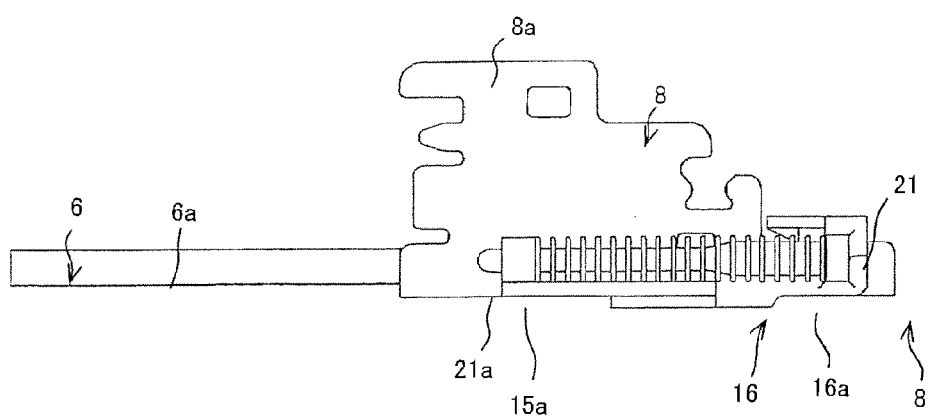

As shown in FIG. 4 (B) and FIG. 5 (A), the first end 15a of the ejector 15 is slidably fitted on the first ejector spring guide 21a, and the second end 15b of the ejector 15 is slidably fitted on the second ejector spring guide 21b. The first end 15a of the ejector 15 is always urged toward the tongue insertion hole 17 by the urging force of the first ejector spring 16a, and the second end 15b of the ejector 15 is always urged toward the tongue insertion hole 17 by the urging force of the second ejector spring 16b.

In the tongue 7 of this example configured as above, when the tongue 6 is separated from the buckle 7, the tongue 6 is in a non-operational state as shown in FIGS. 2 (A) and 2 (B). In this non-operational state of the tongue 6, the latch member 9 is in a non-latched (non-engaged) position (non-operational position), and the ejector 15 is also in a non-operational position closest to the tongue insertion hole 17. In this non-operational position of the ejector 15, both ends 15a and 15b of the ejector 15 are fitted on the first and second ejector spring guides 21a and 21b, respectively, and stopped in predetermined positions. At this time, the first and second ejector springs 16a and 16b respectively urge the ends 15a and 15b of the ejector 15 relatively weakly toward the tongue insertion hole 17. A sloping end face 13a of the slider 13 is in contact with the lock pin 10 owing to the urging force of the slider spring 14.

In this non-operational state of the buckle 7, in order to put on the seat belt 4, the engagement portion 6a of the tongue 6 is inserted into the buckle 7 through the tongue insertion hole 17. When the engagement portion 6a is inserted a predetermined distance into the buckle 7, the distal end of the engagement portion 6a comes into contact with one end of the ejector 15. When the tongue 6 is inserted further into the buckle 7, the ejector 15 is pushed by the engagement portion 6a, and moves to the right in FIGS. 2 (A) and 2 (B) while compressing the first and second ejector springs 16a and 16b. When the tongue 6 is inserted further into the buckle 7, the distal end of the engagement portion 6a comes into contact with and presses a first portion 9a to be pressed of the latch member 9. The latch member 9 rotates counterclockwise in FIG. 2 (B) about pivot portions 9b and 9c on both side edges of the latch member 9 rotatably supported by the side walls 8a and 8b. A latch portion 9d of the latch member 9 is thereby moved toward the path of movement of the engagement portion 6a of the tongue 6.

When an engagement hole 6b of the engagement portion 6a of the tongue 6 reaches a position where the latch portion 9d of the latch member 9 can enter, the latch portion 9d enters the engagement hole 6b of the engagement portion 6a. In this state, when the occupant releases their hand from the tongue 6, the engagement portion 6a is pressed by the ejector 15 in a direction away from the buckle 7 and moves in the direction. As shown in FIGS. 3 (A) and 3 (B), the end edge of the engagement hole 6b of the engagement portion 6a comes into contact with the latch portion 9d of the latch member 9, and the engagement portion 6a is blocked from moving in the direction away from the buckle 7. Thus, the tongue 6 is engaged with the buckle 7. The seat belt 4 withdrawn excessively is retracted by the seat belt retractor 3, and the seat belt 4 is put on by the occupant.

When the operation button 11 is pressed to the right in FIGS. 3 (A) and 3 (B) from the state of the buckle 7 shown in FIGS. 3 (A) and 3 (B) in order to take off the seat belt 4, the operation button 11 comes into contact with the slider 13 and presses the slider 13. The slider 13 moves to the right in FIGS. 3 (A) and 3 (B) while compressing the slider spring 14, and the latch member 9 rotates clockwise in FIG. 3 (B) about the pivot portions 9b and 9c. The latch portion 9d of the latch member 9 is thereby moved in a direction away from the path of movement of the engagement portion 6a of the tongue 6.

When the latch portion 9d of the latch member 9 exits from the engagement hole 6b of the tongue 6, the engagement of the latch member 9 and the tongue 6 is released. Owing to the urging of the first and second ejector springs 16a and 16b, the ejector 15 moves together with the tongue 6 toward the tongue insertion hole 17 (to the left in FIGS. 3 (A) and 3 (B)). As a result, the tongue 6 separates from the buckle 7. The seat belt 4 withdrawn for putting on it is retracted by the seat belt retractor 3.

Owing to the movement of the slider 13 to the right in FIGS. 3 (A) and 3 (B), the slider 13 exits from between the latch member 9 and the lock pin 10, and owing to the rotation of the latch member 9 in the clockwise direction in FIG. 3 (B), the slider 13 rotates in the same direction. As shown in FIG. 2 (B), the latch member 9 comes into contact with the lock pin 10, and the rotation of the latch member 9 is thereby stopped, and the latch member 9 is brought into the non-operational position (non-latched position) shown in FIG. 2 (B). As shown in FIG. 2 (B), the slider 13 is held in a state where an end face 13*a* of the slider 13 is in contact with the lock pin 10 by the urging force of the slider spring 14. The ejector 15 is brought into the initial non-operational position shown in FIG. 2 (B) by the urging force of the first and second ejector springs 16*a* and 16*b*. When the hand of the occupant is released from the operation button 11, the operation button 11 is brought into the initial non-operational position shown in FIGS. 2 (A) and 2 (B) by the urging force of the button springs 12.

Although in the tongue 7 of this example, the inertial lever member of the tongue and members relating to this inertial lever member described in PTL 1 are not provided, the inertial lever member and members relating to this inertial lever member may be provided. In the tongue described in PTL 1, during the engagement of the latch member and the tongue, the lock pin directly hold the latch member in the latched position. In the tongue 7 of this example, during the engagement of the latch member 9 and the tongue 6, the slider 13 is interposed between the lock pin 10 and the latch member 9, and the slider 13 held by the lock pin 10 holds the latch member 9 in the latched position. Except for the above, the configuration and operation of the buckle 7 of this example are substantially the same as the tongue described in PTL 1.

In the buckle 7 of this example configured as above, the whole of the ejector spring 16 that always urges the ejector 15 toward the tongue insertion hole 17 is provided in a position out of an area $\alpha$ of the path of movement of the engagement portion 6*a* of the tongue 6 and an imaginary extended area $\beta$ extending from the area $\alpha$ of the path of movement of the engagement portion 6*a* in the direction of movement of the engagement portion 6*a*. Therefore, the bracket 18 for fixing the buckle 7 to the vehicle body can be provided much closer to the tongue insertion hole 17 compared to the above-described conventional buckle. Consequently, the length of the buckle 7 in the direction of movement of the tongue 6 can be significantly reduced.

In particular, since the ejector spring 16 is divided into the first ejector spring 16*a* and the second ejector spring 16*b*, the first ejector spring 16*a* can be provided on the outer side (on the side opposite to the second side wall 8*b*) of the first side wall 8*a* of the base 8 having a U-shaped cross-section, and the second ejector spring 16*b* can be provided on the outer side (on the side opposite to the first side wall 8*a*) of the second side wall 8*b* of the base 8 without exerting a moment on the ejector 15. In that case, because the operation button 11 needs to have a certain size, there is a dead space on the outer side of each of the side walls 8*a* and 8*b*. The dead spaces can be effectively utilized by providing the first and second ejector springs 16*a* and 16*b* in these spaces. When the first and second ejector springs 16*a* and 16*b* are provided in these spaces, the size of the buckle 7 in the direction of insertion of the tongue 6 can be reduced almost without increasing the size of the buckle 7 in a direction perpendicular to the direction of insertion of the tongue 6 in a plane parallel to the plane of the engagement portion 6*a* of the tongue 6.

In the seat belt apparatus 1 of this example, since the length of the buckle 7 in the direction of insertion of the tongue 6 can be reduced, the buckle 7 does not protrude from the vehicle seat 2. Consequently, the possibility that the buckle 7 makes the occupant sitting in the vehicle seat 2 uncomfortable can be inhibited. In particular, in a seat belt apparatus 1 provided in the rear seat, the possibility that the buckle 7 makes the occupant uncomfortable can be inhibited more effectively. Consequently, when the buckle 7 is installed in the vehicle compartment, the buckle 7 hardly makes the occupant uncomfortable, and at normal time, the occupant can feel comfortable in the vehicle compartment.

The buckle according to the present invention is not limited to the above-described example, and various design changes can be made. In the above-described example, the ejector spring 16 includes a pair of first and second ejector springs 16*a* and 16*b*, and the whole of the first and second ejector springs 16*a* and 16*b* is provided on the outer side of each of the side walls 8*a* and 8*b* of the base 8 in a plane parallel to the bottom portion 8*c* of the base 8 including the path of movement of the engagement portion 6*a* of the tongue 6. However, for example, the whole of a single ejector spring 16 may be provided out of the area of movement of the engagement portion 6*a* of the tongue 6 in a plane in such a direction that the whole of the first and second ejector springs 16*a* and 16*b* are perpendicular to the bottom portion 8*c* of the base 8, for example, in a position below the bottom portion 8*c* of the base 8. That is, various design changes can be made to the present invention within the scope defined by the claims.

Industrial Applicability

The buckle and seat belt apparatus of the present invention can be suitably used as a buckle with which a tongue supported by a seat belt is engaged in order to make the seat belt wearable, and a seat belt apparatus including this.

The invention claimed is:

1. A buckle comprising:
   a base;
   a tongue insertion hole into which an engagement portion of a tongue is inserted;
   a latch member supported by the base movably between a non-engaged position where the latch member cannot be engaged with the engagement portion of the tongue inserted through the tongue insertion hole and an engaged position where the latch member can be engaged with the engagement portion of the tongue inserted through the tongue insertion hole;
   a release operation member that moves the latch member in the engaged position toward the non-engaged position;
   an ejector that is movably provided in the base and that presses the engagement portion of the tongue inserted through the tongue insertion hole in a direction in which the engagement portion separates from the tongue insertion hole; and
   an ejector spring that urges the ejector toward the tongue insertion hole, wherein the whole of the ejector spring is provided in a position out of an area of the path of movement of the engagement portion of the tongue inserted through the tongue insertion hole and an imaginary extended area extended from the area of the path of movement of the engagement portion of the tongue in the direction of movement of the engagement portion.

2. The buckle according to claim 1,
   wherein the base has first and second side walls arranged at a predetermined interval and extended in the same or substantially the same direction as the direction of movement of the engagement portion of the tongue inserted through the tongue insertion hole,
   wherein the first and second side walls respectively have first and second through-holes through which the ejector is movably passed,
   wherein the ejector spring includes first and second ejector springs, wherein the ejector presses the engagement portion of the tongue inserted through the tongue insertion hole between the first and second side walls of the base, and wherein the first ejector spring presses a part of the ejector passed through the first through-hole of the first side wall of the base, and the second ejector spring presses another part of the ejector passed through the second through-hole of the second side wall of the base.

3. A seat belt apparatus comprising:

a seat belt capable of restraining an occupant;

a seat belt retractor that is provided in a vehicle body and that retracts the seat belt;

a tongue slidably supported by the seat belt; and a buckle that is provided in the vehicle body and with which the tongue is disengageably engaged, wherein the buckle is the buckle according to claim 2.

4. A seat belt apparatus comprising:

a seat belt capable of restraining an occupant;

a seat belt retractor that is provided in a vehicle body and that retracts the seat belt;

a tongue slidably supported by the seat belt; and a buckle that is provided in the vehicle body and with which the tongue is disengageably engaged, wherein the buckle is the buckle according to claim 1.

* * * * *